Re. 24885

Nov. 19, 1957     J. W. NAREL ET AL     2,813,380
GRINDING MACHINE – WORK LOADER

Filed June 5, 1956     4 Sheets-Sheet 1

INVENTOR
JOSEPH W. NAREL
GLOVER C. JOYCE
BY Harold W. Eaton
ATTORNEY

Nov. 19, 1957 J. W. NAREL ET AL 2,813,380
GRINDING MACHINE – WORK LOADER
Filed June 5, 1956 4 Sheets-Sheet 2
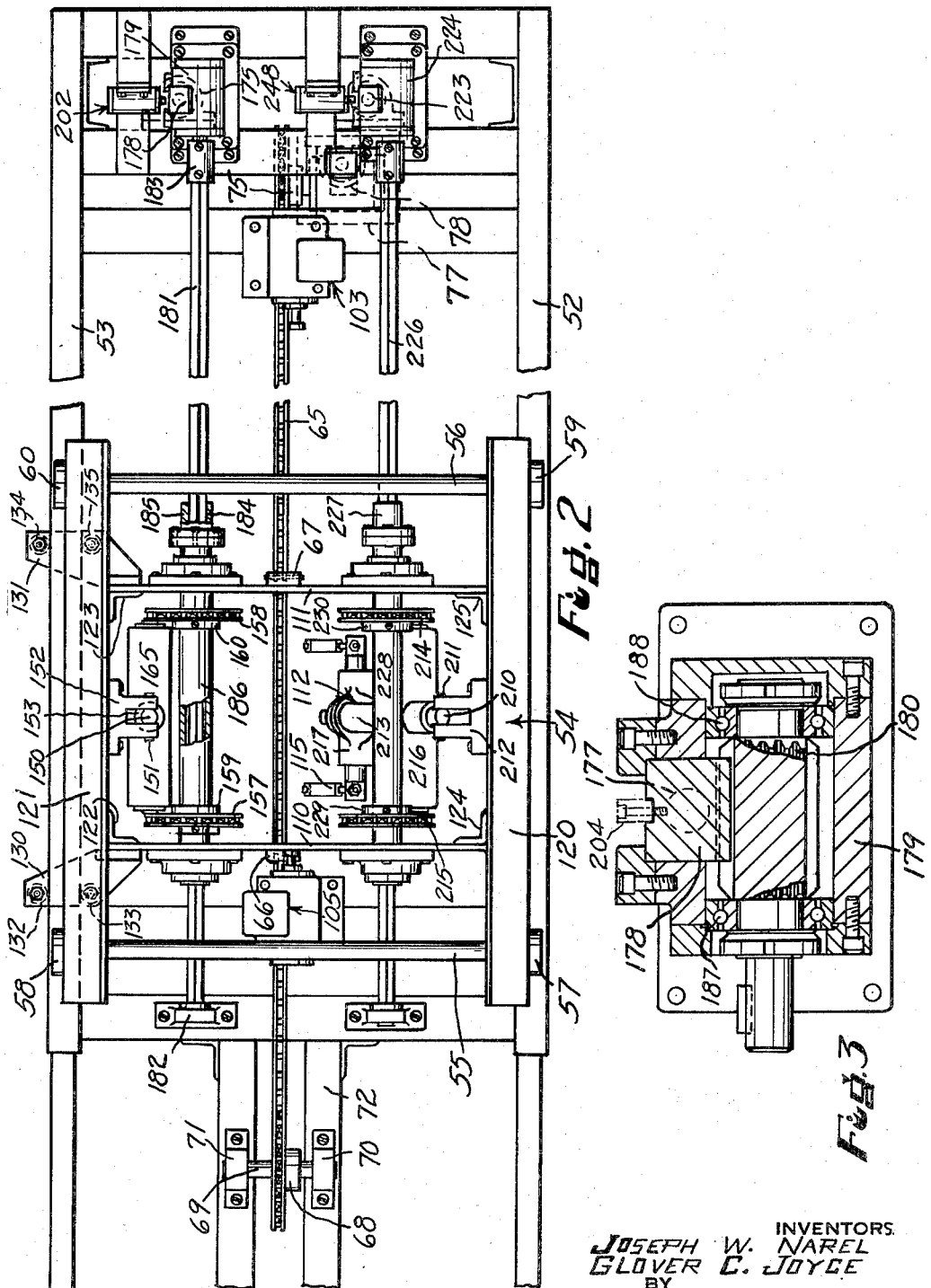
INVENTORS.
JOSEPH W. NAREL
GLOVER C. JOYCE
BY
Harold W. Eaton
ATTORNEY

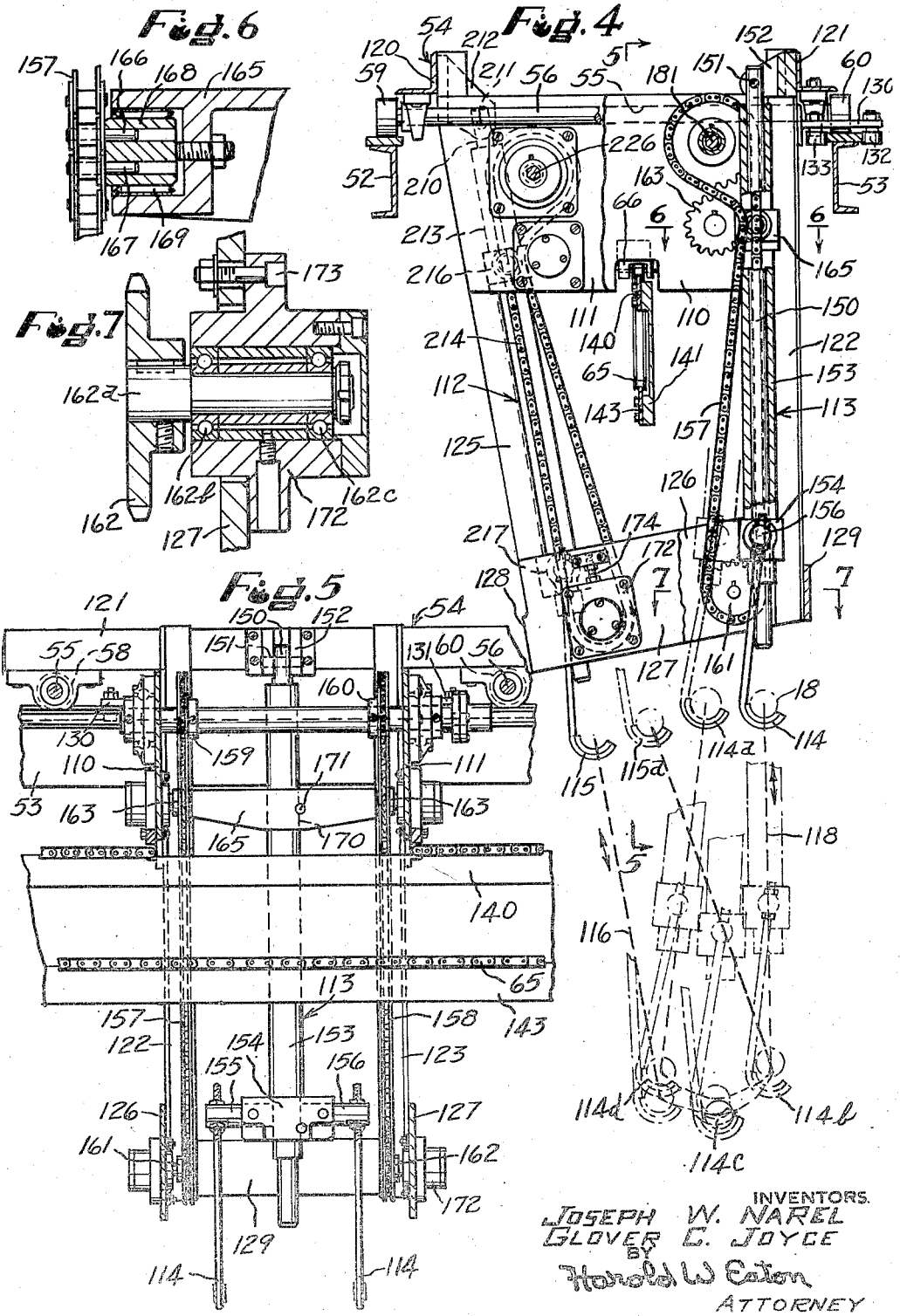

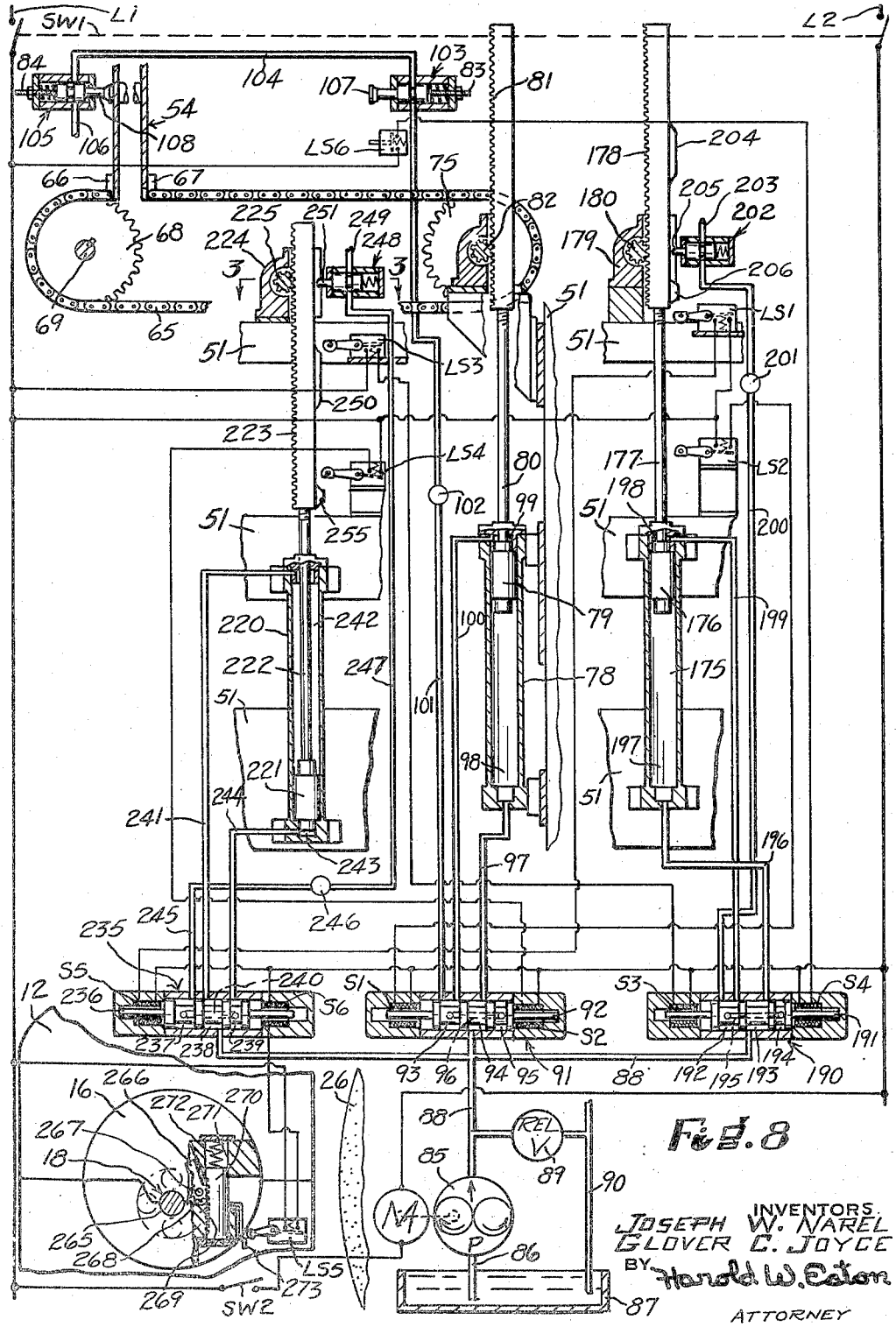

United States Patent Office 2,813,380
Patented Nov. 19, 1957

2,813,380
GRINDING MACHINE-WORK LOADER

Joseph W. Narel and Glover C. Joyce, Worcester, Mass., assignors to Norton Company, Worcester, Mass., a corporation of Massachusetts Application June 5, 1956, Serial No. 589,480

11 Claims. (Cl. 51—105)

The invention relates to machine tools, and more particularly to an automatic work loading, transferring and discharging apparatus for a grinding machine.

One object of the invention is to provide a simple and thoroughly practical work loading, transferring and discharging apparatus for a machine tool, such as, a crankshaft grinding machine. Another object is to provide a duplex work loader for picking-up and depositing work piece at the same location on a conveyor. Another object is to provide a pair of angularly disposed work loaders each of which is provided with spaced work engaging hook, said pairs of hooks being arranged to move successively through U-shaped overlapping paths in the opposite directions to facilitate a rapid picking-up and depositing work pieces at the same position.

Another object is to provide means actuated by the pot chucks to initiate a pick-up cycle of one of the work loaders. Another object is to provide an interlock between said loaders whereby completion of the cycle of one of the loaders serves to initiate a cycle of the other loader. Another object is to provide an electrical interlock between said pot chucks and one of said loaders whereby unclamping of said chucks after a grinding operation serves to initiate a pick-up cycle of one of said loaders to raise a ground work piece to a transfer position. Another object is to provide an interlock between said loaders whereby completion of a pick-up cycle of one of said loaders serves to initiate a work depositing cycle of the other loader.

A further object is to provide an interlock between said loaders and said carriage actuating means whereby completion of a pick-up and depositing cycle of said loaders at the conveyor station serves to initiate a traversing movement of said carriage and loaders to the grinding station.

A still further object is to provide an interlock between said loaders and carriage actuating mechanism whereby completion of a pick-up and depositing cycle of said loaders at the grinding station serves to initiate a traversing movement of the carriage and loaders toward the conveyor station. Other objects will be in part obvious or in part pointed out hereinafter.

In the accompanying drawings, in which is shown one of various possible embodiments of the mechanical features of this invention;

Fig. 2 is a fragmentary plan view, on an enlarged scale, of the work loading mechanism;

Fig. 3 is a cross sectional view, on an enlarged scale, taken approximately on the line 3—3 of Fig. 8;

Fig. 4 is an end elevation, on an enlarged scale, of the work loader units, having parts broken away and shown in section;

Fig. 5 is a fragmentary vertical sectional view, taken approximately on the line 5—5 of Fig. 4, showing one of the work loader units;

Fig. 6 is a fragmentary sectional view, on an enlarged scale, taken approximately on the line 6—6 of Fig. 4, showing the driving connection between the link chain and the slide of the work loader unit;

Fig. 7 is a fragmentary sectional view, on an enlarged scale, taken approximately on the line 7—7 of Fig. 4, through one of the rotatable sprockets of the loader chain driving mechanism; and Fig. 8 is a combined hydraulic and electric diagram, showing the operation of the various mechanisms of the machine.

Figure 1:
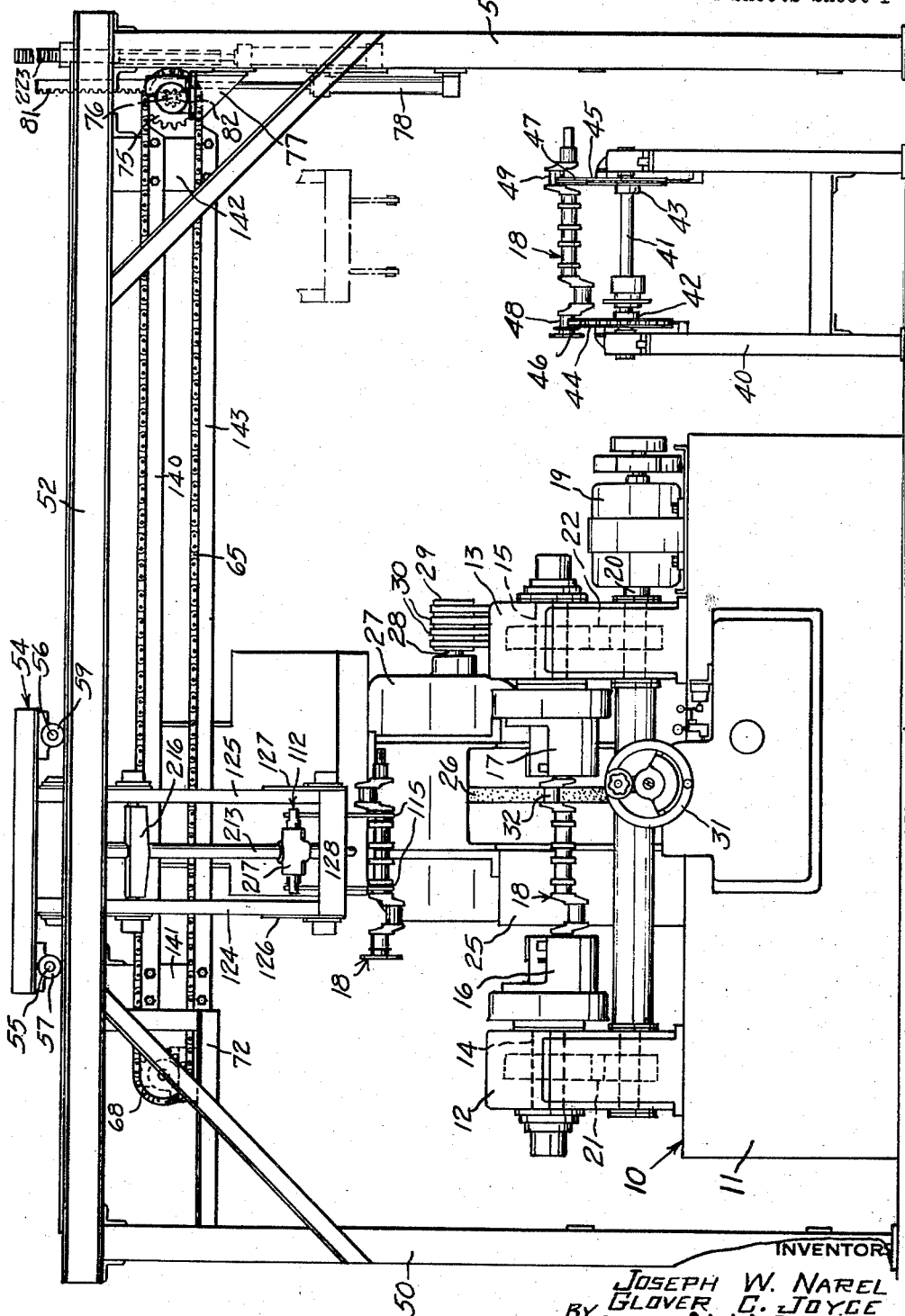
Fig. 1 is a front elevation of a crank shaft grinding machine showing the work loading mechanism.

As shown in the drawings the work loader mechanism has been illustrated as applied to a single crank pin grinding unit. In actual practice of the invention a plurality of crank pin grinding units may be provided, one unit for grinding each crank pin on the crank shaft to be ground.

As shown in Fig. 1, a crank pin grinding unit 10 comprises a base 11 which supports a pair of spaced work heads 12 and 13. The work heads 12 and 13 are provided with axially aligned rotatable spindles 14 and 15, respectively, which are journaled in suitable bearing (not shown). The spindles 14 and 15 support a pair of pot chucks 16 and 17, respectively, for supporting opposite ends of a crankshaft 18 to be ground. A driving mechanism is provided comprising an electric motor 19 supported on the base 10 which drives a longitudinally extending shaft 20. The shaft 20 is drivingly connected by link chains 21 and 22 synchronously to rotate the spindles 14 and 15 and the pot chucks 16 and 17 during a crank pin grinding operation. This work supporting and driving mechanism may be identical with that disclosed in the pending application Serial No. 434,484, by Herbert A. Silven and Stewart S. Mader, filed June 4, 1954, now Patent No. 2,780,895, dated February 12, 1957, to which reference may be had for details of disclosure not contained herein.

The base 10 also serves as a support for a transversely movable wheel slide 25. The wheel slide 25 is supported in the conventional manner on a V-way and a flat way (not shown). The wheel slide 25 is provided with a rotatable spindle (not shown) for supporting a grinding wheel 26. The grinding wheel 26 is driven by an electric motor 27 mounted on the upper surface of the wheel slide 25. The motor 27 is provided with a motor shaft 28 which supports a multiple V-groove pulley 29 which is connected by multiple V-belts 30 with the wheel spindle.

A conventional type feeding mechanism is provided for feeding the wheel slide 25 transversely as indicated by a manually operable feed wheel 31. The feed wheel 31 is rotatably supported on the front of the machine base 10 and is operatively connected in the conventional manner with a nut and screw mechanism (not shown) to impart a transverse feeding movement to the wheel slide 25 to feed the grinding wheel toward a crank pin 32 on the crank shaft 16 to grind the same to a predetermined size.

A conveyor mechanism is provided which is diagrammatically illustrated in Fig. 1 as comprising a frame 40 which supports a rotatable shaft 41. The shaft 41 is provided with a pair of spaced sprockets 42 and 43 which support and drive a pair of spaced link chains 44 and 45 respectively to convey successive crank shafts 18 into a predetermined loading position.

The conveyor chains 44 and 45 are synchronously indexed and are provided with a plurality of spaced V-shaped upwardly extending brackets 46 and 47, respectively. The brackets 46 and 47 are arranged to support a main bearing 48 and a crankpin 49 respectively of the crankshaft 18 (Fig. 1). The brackets 46—47 serve to orient the crankshaft so that it is in the desired position for transfer into the pot chucks 16—17. In case multiple grinding units 10 are employed, they are arranged parallel to each other and the brackets 46—47 are spaced in pairs along the chains 44—45 by a distance equal to the spacing of the grinding units. The V-block bracket 46—47 are substantially the same as those disclosed in my copending application Serial No. 545,923, filed November 9, 1955. If multiple grinding units are employed, each unit is provided with a work loading mechanism identical with that shown in Fig. 1.

The work loading apparatus as shown in Fig. 1 comprises a pair of vertically arranged frames 50 and 51. The frames 50 and 51 support a pair of spaced parallel rails 52 and 53 (Figs. 1 and 2). The rails 52 and 53 extend longitudinally and are arranged substantially parallel to the axes of the crank shaft 18 to be ground and the grinding wheel 26. The rails 52 and 53 serve as guide ways for a longitudinally movable carriage 54. The carriage 54 is provided with a pair of spaced rotatable shafts 55 and 56 which are provided with wheels 57—58 and 59—60 which ride upon the upper face of the rails 52 and 53.

A power operated mechanism is provided for transversing the carriage 54 longitudinally from a position over the grinding unit 10 to a position over the conveyor chain 44—45. A link chain 65 is provided for transversing the carriage 54. The ends of the link chain 65 are connected to brackets 66—67 respectively which are fixedly mounted on the carriage 54 (Fig. 2). The left hand end of the chain 65 wraps around and meshes with a sprocket 68. The sprocket 68 is mounted on a rotatable shaft 69 which is supported in bearings 70 and 71 which are in turn supported by a bracket 72. The bracket 72 is fixedly supported on the vertical frame 50 and the rails 52—53 (Figs. 1 and 2). The right hand end of the link chain 65 wraps around and meshes with a sprocket 75 which is supported on a rotatable shaft 76. The shaft 76 is supported by a bracket 77 which is fastened to the vertical frame 51.

A fluid pressure operated mechanism is provided for actuating the chain 65 to cause the desired transverse movement of the carriage 54 is either direction. This mechanism comprises a cylinder 78 which is fixedly mounted on the vertically arranged frame 51. The cylinder 78 contains a slidably mounted piston 79 which is fixedly supported on the lower end of a piston rod 80 (Fig. 8). The upper end of the piston rod is connected to a vertically arranged rack bar 81. The rack bar 81 meshes with a small gear 82 which is mounted on the shaft 76. It will be readily apparent from the foregoing disclosure that movement of the piston 79 in a downward direction (Fig. 8) serves to cause a downward movement of the rack bar 81 so as to rotate the gear 82 and the sprocket 75 in a clockwise direction so as to produce a clockwise movement of the link chain 65 thereby transversing the carriage 54 toward the right.

Similarly an upward movement of the piston 79 serves to impart a counter clockwise rotary motion to the sprocket 75 and the link chain 65 to cause a movement of the carriage 54 toward the left.

A fluid pressure system is provided comprising a motor driven fluid pump 85 which draws fluid through a pipe 86 from a fluid reservoir 87 and forces fluid under pressure through a pipe 88 to the various mechanisms as will be hereafter described. A relief valve 89 is provided in the pipe 88 to facilitate by-passing excess fluid under pressure through a pipe 90 into the reservoir 87 to facilitate maintaining substantially uniform pressure within the pipe 88.

A control valve 91 is provided for controlling the admission to and exhaust of fluid from the cylinder 78. The valve 91 is a piston-type valve comprising a slidably mounted valve member 92 having a plurality of spaced integral valve pistons arranged to form spaced valve chambers 93, 94, and 95. The valve member 92 is provided with a central passage 96 which connects the valve chamber 93 with the valve chamber 95. A solenoid S1 is provided for moving the valve member 92 toward the left and a solenoid S2 is provided for moving the valve member 92 toward the right. The valve member 92 is maintained either in one end position or the other.

In the position of the valve 91 (Fig. 8) fluid under pressure from the pipe 88 enters the valve chamber 94 and passes through a pipe 97 into a cylinder chamber 98 formed at the lower end of the cylinder 78 to move the piston 79 into an uppermost position as illustrated in Fig. 8. During this movement of the piston 79 fluid within a cylinder chamber 99 formed at the upper end of the cylinder 78 may exhaust through a pipe 100 into the valve chamber 93 and through a pipe 101, through a throttle valve 102, through a slow-down valve 103, through a pipe 104, through a slow-down valve 105, and through an exhaust pipe 106 into the reservoir 87. It will be readily apparent from the foregoing disclosure that when the solenoid S1 is energized, the valve member 92 moves toward the left so that fluid under pressure entering the valve chamber 94 passes through the pipe 100 into the cylinder chamber 99 to cause a downward movement of the piston 79. During the downward movement of the piston 79 fluid within the chamber 98 exhausts through the pipe 97 into the valve chamber 95, through the central passage 96 into the valve chamber 93 and exhausts through the pipe 101, the throttle valve 102, the slow-down valve 103, the pipe 104, the slowdown valve 105, and exhausts through the pipe 106 into the reservoir 87.

The slow down valves 103 and 105 are piston-type valves which are provided with actuating plungers 107 and 108 respectively. The valves 103 and 105 are normally open to allow unrestricted exhaust of fluid therethrough. When the carriage 54 is moved in either direction, as it approaches the end of its stroke, it engages either the actuating plunger 107 or the plunger 108 so as to gradually and partially cut-off the exhaust of fluid passing therethrough to cause a slow-down of the carriage 54 as it approaches the end of its stroke. A pair of adjustable stop screws 83 and 84 are provided to determine the extent of movement of the plungers 107 and 108 respectively, thereby determining the extent of the slow-down action of the valves 103 and 105 respectively. The stop screws 83 and 84 also serve as positive stops to limit the movement of the carriage toward the right and toward the left respectively.

In order to facilitate a rapid removal of a ground crank shaft 18 from the pot chucks 16—17 and the insertion of a crank shaft to be ground therein, a duplex loading arrangement is provided. The carriage 54 is formed with a pair of spaced angle irons 120 and 121 (Fig. 2). A plurality of substantially vertical angle irons 122, 123, 124, and 125 are welded to the angle irons 120 and 121. A pair of vertical side plates 110 and 111 are fixedly welded to the angle irons 122—124 and 123—125, respectively. The lower ends of the vertically arranged angle irons are provided with side plates 126 and 127 (Figs. 4 and 5) which are welded to the lower ends of the angle irons 122—124, and 123—125. A pair of longitudinally extending plates 128 and 129 are welded to the lower ends of the angle irons 124—125 and 122—123 respectively to form a rigid supporting frame depending from the carriage 54 to support a pair of work loader units 112 and 113 respectively. The work loader units 112 and 113 are positioned angularly relative to each other so that the hooks 115 and 114 respectively travel successively through substantially U-shaped overlapping paths in the opposite directions to facilitate picking-up crankshafts from and depositing crankshafts in the pot chucks 16—17 and also picking-up crankshafts from the conveyor chains and depositing crankshafts in the same position on the conveyor chains 44—45.

The carriage 54 is provided with a pair of fixed brackets 130 and 131. The bracket 130 is provided with a pair of spaced rollers 132 and 133 which are arranged to engage the opposite side faces of the rail 53. Similarly the bracket 131 is provided with a pair of spaced rollers 134 and 135 which engage opposite side faces of the rail 53. The rollers 132—133 and 134—135 serve as guides for the carriage 54 during its longitudinal traversing movement.

Each of the loaders 112 and 113 are provided with a pair of downwardly projecting hooks 114 and 115 which are arranged to support a crank shaft 18. As illustrated in Fig. 4, the loader 112 operates first and the hooks 115 of the loader 112 move through a substantially U-shaped path indicated by the broken line 116 so that the hooks move downwardly and swing under a ground crank shaft supported in the pot chucks 16—17 and then move upwardly into the position 115a.

During this movement a crank shaft to be ground is positioned in the hooks 114 of the loader 113. The hooks 114 move downwardly in the direction of the arrow (Fig. 4) and travel in a path as indicated by the broken line 118 to deposit a crank shaft to be ground in the pot chucks 16—17 after which the hooks 114 swing in a clockwise direction and then upwardly into the position 114a. The grinding operation may then proceed on the crank shaft just deposited in the pot chucks 16—17. During the grinding operation, the carriage 54 is traversed toward the right to a position directly over the conveyor chains 44—45. When the carriage 54 reaches this position, the hooks 114 of loader 113 move downwardly from broken line position 114a to pick-up a crankshaft 18 to be ground from the brackets 46—47 on the conveyor chains 44—45 and then move upwardly into the full line position 114 (Fig. 4). When the hooks 114 of loader 113 reach an uppermost position, the hooks 115 of loader 112 move downwardly from position 115a and swing in a clockwise direction to deposit a ground crankshaft 18 on the same set of brackets 46—47 on conveyor chains 44—45 and then move upwardly into position 115 (Fig. 4). The carriage 54 is then traversed toward the left to position the work loaders 112—113 directly over the grinding unit 10 so that they are ready for the next loading operation.

A guide bar 140 (Fig. 1) is fastened to a bracket 141 and a bracket 142 which are fixed relative to the rails 52 and 53. The upper surface of the bar 140 serves as a support for the link chain 65. Similarly a guide bar 143 is fixedly supported by the brackets 141 and 142. The upper surface of the bar 143 serves as a sliding support for the lower portion of the link chain 65.

The work loader units 112 and 113 are substantially identical in construction, consequently only the loader 113 will be described in detail. It should be noted that the work loader 113 is arranged substantially vertical (Fig. 4) and the loader 112 is arranged at a slight angle to the vertical so that the loader hooks of each unit converge at the lower ends of their stroke to facilitate picking up and depositing crank shaft 18.

The work loader 113 comprises a vertically extending rod 150 which is pivotally connected by a stud 151 to a bracket 152 which is fixedly mounted on the angle iron 121 of the carriage 54. A slidably mounted tube 153 is supported on the rod 150. The lower end of the tube 153 is provided with a bracket 154 having laterally extending studs 155 and 156 (Fig. 5) which support the work loader hooks 114 and 115.

A pair of spaced link chains 157 and 158 are provided for actuating the loader hooks 114 of the work loader 113. The chains 157 and 158 wrap around a pair of spaced driving sprockets 159 and 160. The lower ends of the chains 157 and 158 wrap around a pair of sprockets 161 and 162. The sprockets 161—162 are each keyed onto an independent shaft 162a which is journaled in spaced anti-friction bearings 162b and 162c (Fig. 7) carried by a housing 172. Only one of the units has been illustrated in detail in Fig. 7. The housing 172 is adjustably supported on the side plate 127 by a plurality of clamping screws 173 which pass through clearance holes formed in the plate 127. An adjusting screw 174 (Fig. 4) supported by the side plate 127 is provided for adjusting the housing 172 relative to the side plate 127 to facilitate tensioning the link chains 157—158. A similar adjustable support is provided for the sprockets at the lower ends of the link chains 157, 214, and 215 to facilitate independently adjusting the tension of each of the work loader driving chains. The supports for the idler sprockets 163 are substantially identical in construction to that shown in Fig. 7.

A pair of spaced idler sprockets 163 each mounted on an independent rotatable shaft 174 are provided to facilitate taking up the back-lash in the link chains 157 and 158 and also to aid in determining the path of movement of the loader hooks 114. The link chains 157—158 are connected by a cross head 165 (Figs. 5 and 6). The opposite ends of the cross head 165 are connected to the link chains 157 and 158 by means of a pair of pins 166 and 167 (Fig. 6) which replace the normal pins of the link chains. The studs 166 and 167 extend into mating apertures formed in a rotatable sleeve 168 which is supported by a needle bearing 169 in the opposite ends of the cross head 165. This mechanism serves to time the movement of the chains 157 and 158 so that they move synchronously to carry the loader hooks 114 through the path as indicated by the broken line 118.

The tube 153 passes through a central aperture 170 in the cross head 165 and is pinned thereon by means of a pin 171. Movement of the link chains 157—158 in a clockwise direction (Fig. 4) serves to cause a substantially vertical movement of the cross head 165 together with the tube 153 thereby causing a substantially vertical downward movement of the work hooks 114 into position 114b (Fig. 4). When the cross head and tube reach this position, the axis of the supports for the cross head 165 starts movement in a circular direction as the link chains move around the sprockets 161—162 so that the work hooks 114 move an arcuate path in a clockwise direction to deposit a crank shaft 18 to be ground in the pot chucks 16—17. The movement of the cross head continues so that the loader hooks 114 travel through positions 114c and 114d after which the cross head 165 moves upwardly into a loading position with the loader hooks 114 in position 114a. The broken line 118 (Fig. 4) illustrates the U-shaped path of movement of the loader hooks 114.

A fluid pressure operated driving mechanism is provided for driving the link chains 157—158 comprising cylinder 175 (Fig. 8) which is fixedly mounted on the vertical frame 51. The cylinder 175 contains a slidably mounted piston 176 which is connected to the lower end of a piston rod 177. The upper end of the piston rod 177 is connected to a slidably mounted rack bar 178 which is operably supported in a bracket 179. The rack bar 178 meshes with a gear 180 which is connected by a coupling 183 with the right hand end of a rotatable drive shaft 181 (Fig. 2). The drive shaft 181 is rotatably supported in bearings 182 at its left hand end (Fig. 2). A pair of spaced anti-friction bearings 187 and 188 (Fig. 3) support the gear 180 and the right hand end of the shaft 181. The drive shaft 181 is hexagonal in cross section, as shown in Fig. 4. The drive shaft 181 passes through correspondingly shaped aperture 184 formed in a flanged sleeve 185 which is fastened to a rotatable hollow sleeve 186 which supports the sprockets 159 and 160. It will be readily apparent from the foregoing disclosure that movement of the piston 176 within the cylinder 175 will be imparted through the rack bar 178, the gear 180 to rotate the drive shaft 181 which in turn synchronously drive the link chains 157 and 158 to cause the loader hooks 114 to move through the path 118 (Fig. 4), as above described. During this path of movement of the loader hooks, as the cross head 165 travels around the sprockets 161—162, the tube 153 together with the guide rod 150 will swing about the stud 151 as an axis.

A control valve 190 is provided for controlling the admission to and exhaust of fluid from the cylinder 175. The control valve 190 is a piston-type valve having a slidably mounted valve member 191 which is formed with the plurality of spaced integral valve pistons forming a plurality of valve chambers 192, 193, and 194. The slidably mounted valve member 191 is provided with a central passage 195 which connects the valve chamber 192 with the valve chamber 194. The control valve 190 is normally positioned either in a right hand or left hand end position. A solenoid S3 is provided which when energized serves to shift the valve member 191 into a left hand end position. Similarly a solenoid S4 is provided which when energized serves to shift the valve member 191 into a right hand end position.

In the position of the valve 190 (Fig. 8) fluid under pressure from the pipe 88 enters the valve chamber 193 and passes through a pipe 196 into a cylinder chamber 197 formed at the lower end of the cylinder 175 cause the piston 176 to move to an uppermost position, as illustrated in Fig. 8. During each movement of the piston 176 either upward or downward causes the loader hooks 114 to move through a substantially U-shaped path as indicated by the broken line 118. During the upward movement of the piston 176, fluid within a cylinder chamber 198 formed at the upper end of the cylinder 175 exhausts through a pipe 199, into the valve chamber 192, through pipe 200, through throttle valve 201, through a slow-down valve 202, and exhausts through a pipe 203 into the reservoir 87.

A cam 204 on the rack bar 178 is arranged to engage the actuating plunger 205 of the slow-down valve 202 when the cross head starts a semi-circular movement about the axis of the sprockets 161—162 to partially cut off the exhaust of fluid passing through the slow-down valve 202 so as to slow down the movement of the link chains 157—158 during the swinging movement of the loader hooks 117.

The rack bar 178 is provided with a switch actuating cam 206 which is arranged during the upward movement of the piston 76 to close the normally open limit switch LS1. During the downward movement of the piston 176, the cam 206 closes the normally open limit LS2. Both of these limit switches are actuated only in one direction. The function of the limit switches LS1 and LS2 will be described hereinafter.

Describing briefly the work loader 112, a slide rod 210 (Fig. 4) is pivotally mounted on a stud 211 carried by a bracket 212. A tubular member 213 is slidably supported on the rod 210. The tubular member 213 is connected to a cross head 216, the opposite ends of which are connected to a pair of spaced link chains 214 and 215. The link chains are arranged identical with the arrangement shown in connection with the work loader 113. The lower end of the tubular member 213 is provided with a bracket 217 which carries the work hooks 115. For further details of the construction of the loader 112, reference may be had to the description used in connection with work loader 113.

A fluid pressure operated mechanism is provided for actuating the work loader 112 comprising a cylinder 220 (Fig. 8) which contains a slidably mounted piston 221 which is connected to the lower end of a piston rod 222. The upper end of the piston rod 222 is connected to a rack bar 223 which is slidably supported in a housing 224. The rack bar 223 meshes with a gear 225 which is rotatably journaled within the housing 224. The gear 225 is operatively connected to drive a hexagonally-shaped aperture in a flanged sleeve 227. The sleeve 227 is fixedly mounted on the end of a hollow drive shaft 228 which supports a pair of sprockets 229 and 230 for driving the link chains 214—215. A control valve 235 is provided for controlling the admission to and exhaust of fluid from the cylinder 220. The control valve 235 is a piston-type valve having a slidably mounted valve member 236 formed with a plurality of spaced integral valve pistons to form a plurality of spaced valve chambers 237, 238, and 239. The valve member 236 is provided with a central passage 240 which connects the valve chamber 237 with the valve chamber 239. A solenoid S5 is provided which when energized serves to shift the valve member 236 toward the left. Similarly a solenoid S6 is provided which when energized serves to shift the valve member 236 toward the right. In the position of the valve 235 (Fig. 8), fluid from the pipe 88 passes through the valve chamber 238 and through a pipe 241 into a cylinder chamber 242 formed at the upper end of the cylinder 220 to cause a downward movement of the piston 221 into the position illustrated in Fig. 8. During this movement of the piston 221, fluid within a cylinder chamber 243 formed at the lower end of the cylinder 220 exhausts through a pipe 244, through the valve chamber 239, through the central passage 240 into the valve chamber 237, through a pipe 245, through a throttle valve 246, through a pipe 247, through a slow-down valve 248, and through an exhaust pipe 249 into the reservoir 87.

A cam 250 mounted on the rack bar 223 is arranged to actuate the stem 251 of the valve 248 to gradually throttle the exhaust of fluid passing through the slow-down valve 248 during the movement of the piston 221 in either direction.

A cam 255 mounted on the rack bar 223 is arranged to close a normally opened limit switch LS3 during the upward movement of the piston 221 and to close the normally open limit switch LS4 during the downward movement of the piston 221. The limit switches LS3 and LS4 are arranged so that they are actuated in one direction only. The function of the limit switches LS3 and LS4 will be hereinafter described.

The pot chucks 16 and 17 are old and well known features in crank shaft grinding machines, consequently, they have not been illustrated in detail. The pot chuck 16 has been diagrammatically illustrated in Fig. 8 and is provided with a half bearing surface 265 for supporting the left hand end of the crank shaft to be ground. The pot chuck 16 is provided with a clamping jaw 266 which is pivotally supported on a stud 267. The clamping jaw 266 is provided with a gear segment 268 which meshes with rack teeth 269 formed on a slidably mounted piston 270. The piston 270 is slidably mounted within a cylinder 271 and is normally held in a downward position (Fig. 8) by means of a compression spring 272.

When it is desired to clamp a crank shaft 18 in the pot chucks, fluid under pressure is admitted to the lower end of the cylinder 271 to cause an upward movement of the piston 270 so as to swing the clamping jaw 266 in a counter clockwise direction to clamp the crank shaft 18 to the half bearing surface 265.

During the downward movement of the piston 270 to unclamp the crank shaft 18 after a grinding operation has been completed, an arm 273, which is fixedly mounted to the piston 270, engages the actuating roller of a normally open limit switch LS5 to close a circuit to energize the solenoid S6. The energizing of solenoid S6 shifts the valve 235 into a right hand end position so as to initiate a downward pick-up cycle of the work loader unit 112 to pick-up the ground shaft 18 from the pot chucks 16—17. The limit switch LS5 is a one-way switch and is actuated only during the downward movement of the piston 270 (Fig. 8).

The pot chucks 16—17 are actuated by an in timed relation with the rearward movement of the wheel slide 25 after a grinding operation has been completed in a manner such as disclosed in the pending application, Serial No. 434,484 (Patent No. 2,780,895), above referred to, to which reference may be had for details of disclosure not contained herein. After the work loader unit 113 completes its cycle of depositing a crank shaft 18 to be ground in the pot chucks 16—17, the carriage 54 is traversed toward the right to a position directly over the conveyor chains 44—45. As the carriage approaches the right-hand end of its movement, it engages the plunger 107 to actuate the slow-down valve 103 to gradually slow down and stop the traversing movement of the carriage 54. At the same time the carriage 54 closes the normally open limit switch LS6 to energize the solenoid S4 to shift the valve 190 so as to initiate a pick-up cycle of the work loader 113 to pick-up a crank shaft 18 to be ground from the conveyor chains 44—45 and to raise it to a transfer position. As soon as the work loader 113 completes the pick-up cycle, the valve 235 is shifted to initiate a depositing cycle of the work loader 112 to deposit a ground crank shaft 18 on the conveyor chains 44—45. After the work loader 112 completes its cycle, the carriage 54 is traversed toward the left (Fig. 1) in a position directly over the grinding unit 10 so that it is ready for the next unloading and loading operation.

Power lines L1 and L2 supply electric power to the control circuits, as shown in Fig. 8.

The operation of the work loading apparatus will be readily apparent from the foregoing disclosure. Assuming the mechanisms have been previously adjusted and a crank shaft 18 to be ground is positioned in the pot chucks 16—17, and another crank shaft 18 to be ground is supported by the hooks 114 of the work loader unit 113. When it is desired to start the operation of the work loader units 112 and 113, a switch SW1 is closed to render the electric controls operative. A switch SW2 is then closed to start the fluid pump 85 to supply fluid under pressure to the cylinders 78, 175, and 220. With the control valves 91, 190, and 235 in the positions as illustrated in Fig. 8, the pistons 79 and 176 are held in an upper most position, and the piston 221 is held in a down position.

When the crank shaft 18 supported by the pot chucks 16—17 has been ground to a predetermined extent, the wheel slide 25 and grinding wheel 26 are moved rearwardly to an inoperative position. When the wheel slide 25 reaches and inoperative position, fluid is exhausted from the lower end of the pot chuck cylinder 271 so that the released compression of the spring 272 serves to move the piston 270 downwardly to unclamp the jaw 266. During this movement the arm momentarily closes the limit switch LS5 to energize the solenoid S6 thereby shifting valve member 236 into a right hand end position. With the valve 235 in this position fluid under pressure is passed to the cylinder chamber 243 of the cylinder 220 to start an upward movement of the piston 221 to initiate a pick-up cycle of the work loader unit 112. The hooks 115 move downwardly through a substantially U-shaped path 116 to pick-up the ground crank shaft 18 from the pot chucks 16—17 and to raise it to a transfer position. As the piston 221 approaches its central position, that is, as the hooks 115 approaching a pick-up position, the cam 250 actuates the slow-down valve 248 to slow down the movement of the loader parts. Also as the piston 221 approaches its upper position, the cam 255 momentarily closes the normally open limit switch LS3 to energize the solenoid S3 to shift valve member 191 of the valve 190 into a left hand end position. Fluid under pressure is passed into the cylinder chamber 198 to start a down movement of the piston 176 thereby initiating a cycle of the work loader 113. The hooks 114 supporting a crank shaft to be ground move downwardly through a substantially U-shaped path 118 to deposit the crank shaft 18 in the pot chucks 16—17 and then moves upwardly into the position 114 (Fig. 8). As the piston 176 approaches its central position, that is, as the hooks 114 approach a depositing position, the cam 204 actuates the slow-down valve 202 gradually to slow down the movement of the hooks 114. Also as piston 176 approaches a lowermost position, the cam 206 momentarily closes the normally open limit switch LS2.

The closing of limit switch LS2 serves to energize the solenoid S1 to shift the valve member 92 of the control valve 91 into a left hand end position. Fluid under pressure is then passed into cylinder chamber 99 to cause a down movement of the piston 79, so as to traverse the carriage 54 longitudinally toward the right (Fig. 1) to position the work loader units directly over the conveyor chains 44—45. As the carriage 54 approaches the right hand end position, it engages the plunger 107 and gradually closes the slow-down valve 103 to slow down the longitudinal movement of the carriage 54. At the same time, the carriage 54 closes the normally open limit switch LS6 to energize the solenoid S4 to shift the valve 190 into a right hand end position. With valve 190 in this position, a pick-up cycle of the work loader 113 is initiated. The loader hooks 114 move downwardly from position 114a through the U-shaped path 118 to pick-up a new crank shaft 18 to be ground from the brackets 46—47 on the conveyor chains 44—45 and to raise it to a transfer position with the hooks 114 in the full line position (Fig. 4).

When loader hooks 114 approach a pick-up position during the upward movement of the piston 176, the cam 204 actuates the slow-down valve 202 to slow down the movement of the hooks 114. As the piston 176 approaches the uppermost position, the cam 206 momentarily closes the normally open limit switch LS1 to energize solenoid S5 to shift the valve 235 into a left hand end position so as to initiate a depositing cycle of the loader 112. The hooks 115 move from position 115a (Fig. 4) through a substantially U-shaped path 116 to deposit a ground crank shaft 18 on the same brackets 46—47 on the conveyor chains 44—45. The hooks 115 move upwardly to full line position (Fig. 4). During the latter movement, the cam 255 momentarily closes the limit switch LS4 to energize the solenoid S2 to shift valve 91 into a right hand end position. In this position of the valve 91, the piston 79 moves upwardly to impart a longitudinal traversing movement of the carriage 54 toward the left to position the work loader units 112—113 directly over the pot chucks 16—17 of grinding unit 10. As the carriage 54 approaches the left hand end of its traversing movement, the carriage 54 engages the actuating plunger 108 to actuate the slow-down valve 105 to slow down the traversing movement of the carriage 54 before it reaches the end of its traversing movement.

The transfer movement of the carriage 54 to the right to pick-up crank shaft 18 to be ground from the conveyor chains 44—45 and deposit a ground crank shaft 18 thereon, and the return traversing movement of the carriage 54 toward the left for the next loading operation, takes place while a crank shaft 18 is being ground on the grinding unit 10.

The throttle valves 102, 201, and 246 serve to control the rate of movement of the pistons 79, 176, and 221 respectively.

It will thus be seen that there has been provided by this invention apparatus in which the various objects hereinabove set forth together with any thoroughly practical advantages are successfully achieved. As many possible embodiments may be made of the above invention, and as many changes might be made in the embodiment above set forth, it is to be understood that all matter hereinabove set forth or shown in the accompanying drawings is to be interpreted as illustrative and not in a limiting sense.

We claim:

1. In a crankpin grinding machine having a transversely movable rotatable grinding wheel, a rotatable work support including a pair of spaced axially aligned rotatable pot chucks to support the opposite ends of a crankshaft to be ground, means synchronously to rotate said pot chucks means to impart a transverse feeding movement to the grinding wheel, a work conveyor, work supporting brackets on said conveyor, and a work loading, transferring and discharge apparatus successively to transfer crankshafts between the conveyor and pot chucks including a longitudinally movable carriage, a pair of work loaders thereon each having spaced work engaging hooks, and independent means to move each pair of hooks successively through overlapping substantially U-shaped paths in the opposite directions to facilitate a rapid pick-up and deposit of crankshafts on said conveyor and transfer into said pot chucks.

2. In a crankshaft grinding machine, as claimed in claim 1, in combination with the parts and the features therein specified in which the work loaders are angularly positioned relative to each other so that the work hooks move successively through overlapping substantially U-shaped paths in opposite directions to facilitate a rapid pick-up and deposit of crankshaft at the same position on the conveyor chains.

3. In a crankshaft grinding machine as claimed in claim 1, in combination of the parts and features therein specified of an independent fluid motor to actuate each of said loaders and means including a limit switch actuating by and in timed relation with one of said motors when one motor has completed its cycle to start the other motor so as to initial its cycle of the other loader.

4. In a crankshaft grinding machine, as claimed in claim 3, in combination with the parts and features therein specified of means including a slow-down valve actuated by and in timed relation with movement of said work engaging hooks to slow-down said motor during the pick-up and depositing of a work piece in the pot chucks and on said conveyor.

5. In a crankpin grinding machine as claimed in claim 1, in combination with the parts and features therein specified of means including a fluid motor to traverse said carriage longitudinally in either direction to facilitate positioning the said carriage either over the pot chucks or over the conveyor, a positive stop to limit the movement of the carriage in either direction, and means including a slow-down valve actuated by and in timed relation with movement of said carriage to slow-down its movement in either direction before engagement with the positive stop.

6. In a crankshaft grinding machine, as claimed in claim 1, in combination with the parts and features therein specified of means including a limit switch actuated by movement of said carriage in one direction to initial a pick-up cycle of one of said loaders to pick-up a crankshaft from the brackets on said conveyor chains, means including a limit switch actuated by said pick-up loader as it completes a cycle to initiate a depositing cycle of the other loader to deposit a ground crankshaft onto the same brackets on said conveyor chains, means including a limit switch actuated by the latter loader as it completes its depositing cycle to initiate a longitudinal transversing movement of said carriage in the opposite direction, and means to slow down and stop said carriage in a position directly over said pot chucks.

7. In a crankpin grinding machine, as claimed in claim 1, in combination with the parts and features therein specified a fluid motor to traverse said carriage longitudinally in either direction, a control valve therefor, an independent fluid motor for independently actuating the hooks of each of said work loaders, an independent control valve for each of said motors, and means actuated by and in timed relation with one of said work loader motors as it completes a cycle to actuate the valve for controlling the other loader motor to initiate a cycle of the second loader.

8. In a crankpin grinding machine, as claimed in claim 1, in combination with the parts and features therein specified of a fluid motor to traverse said carriage longitudinally in either direction, a solenoid-actuated control valve therefor, an independent fluid motor for independently actuating the hooks of each of said work loaders, an independent solenoid-actuated control valve for each of said motors, and means including a limit switch actuated by and in timed relation with one of said work loader motors as it completes a cycle to actuate the solenoid valve for controlling the other work loader motor to initiate a cycle of the second work loader.

9. In a crankpin grinding machine, as claimed in claim 1, in combination with the parts and features therein specified of a fluid motor to traverse said carriage longitudinally in either direction, a solenoid-actuated control valve therefor, an independent fluid motor to actuate each of said work loaders, an independent solenoid-actuated control valve for each of said work loader motors, means including a limit switch actuated by movement of said carriage in one direction to actuate one of said latter valves to initiate a pick-up cycle of one of said work loaders to pick-up a crankshaft to be ground from the brackets on said conveyor chains and to raise it to a transfer position, means including a limit switch actuated by said pick-up loader as it completes a cycle to actuate the second loader solenoid control valve to initiate a depositing cycle of the second work loader to deposit a ground crankshaft on the same brackets on said conveyor chains, means including a limit switch actuated by the latter loader as it completes its depositing cycle to actuate the carriage motor control valve to initiate a longitudinal traversing movement of the carriage in the opposite direction to position the work loaders directly over the pot chucks.

10. A grinding machine work loader comprising a longitudinally movable carriage, a vertically arranged slide rod pivotally mounted thereon, a tubular slide on said rod, a pair of spaced work engaging hooks mounted on the lower end of said slide, a pair of spaced vertically arranged parallel link chains, spaced rotatable sprockets to support the upper and lower portions of said chains, a cross head fixedly supported on said slide, pivotal connections between the opposite ends of said head and said chains, and means including a motor operatively connected synchronously to drive said chains, said cross head being arranged to move in a substantially U-shaped path as it travels with said chains about the lower sprockets to swing said rod and slide so as to impart a substantially U-shaped movement to said hooks.

11. A grinding machine as claimed in claim 10 in combination of the parts and features therein specified of a rotatable idler sprocket for each of said chains positioned to maintain the vertical runs of said chains in close proximity to each other at a point adjacent to the upper sprockets to facilitate controlling the extent of swinging the work loader supporting rod and the work engaging hooks.

References Cited in the file of this patent
UNITED STATES PATENTS

| | | |
|---|---|---|
| 2,682,946 | King | July 6, 1954 |
| 2,704,955 | Kendall | Mar. 29, 1955 |
| 2,748,544 | Narel | June 5, 1956 |